(12) United States Patent
Ohrt

(10) Patent No.: US 7,389,246 B1
(45) Date of Patent: Jun. 17, 2008

(54) INSURANCE RATING CALCULATION SOFTWARE COMPONENT ARCHITECTURE

(75) Inventor: Curtis Ohrt, Redwood City, CA (US)

(73) Assignee: Insweb Corporation, Redwood City, CA (US)

( * ) Notice: Subject to any disclaimer, the term of this patent is extended or adjusted under 35 U.S.C. 154(b) by 1508 days.

(21) Appl. No.: 09/504,978

(22) Filed: Feb. 15, 2000

(51) Int. Cl.
*G06Q 40/00* (2006.01)

(52) U.S. Cl. .......................... 705/4; 709/203
(58) Field of Classification Search .................. 705/10, 705/4, 8, 31, 37, 417, 400, 36, 35, 40, 39; 707/5, 6, 9; 709/231, 226, 225, 227, 203, 709/204, 205, 217, 218
See application file for complete search history.

(56) References Cited

U.S. PATENT DOCUMENTS

| | | | |
|---|---|---|---|
| 5,517,645 A | 5/1996 | Stutz et al. ................. 709/316 |
| 5,523,942 A * | 6/1996 | Tyler et al. .................... 705/34 |
| 5,689,650 A * | 11/1997 | McClelland et al. .......... 705/36 |
| 5,689,664 A * | 11/1997 | Narayanan et al. .......... 345/769 |
| 5,897,622 A * | 4/1999 | Blinn et al. .................... 705/26 |
| 5,918,022 A * | 6/1999 | Batz et al. ................... 370/401 |
| 5,918,219 A * | 6/1999 | Isherwood ................... 235/378 |
| 6,026,404 A * | 2/2000 | Adunuthula et al. .......... 707/10 |

OTHER PUBLICATIONS

Conhaim, Wallys W. Buying cars online. Sep/Oct. 1998 Link-Up v15n5 pp. 5, 14. [Retrieved from Dialog on Aug. 26, 2002], Accession No. 01698597 03-49587.*
"The Component Object Model: A Technical Overview," Sara Williams and Charlie Kindel, Developer Relations Group, Microsoft Corp., Oct. 1994.
"DCOM Technical Overview," Microsoft Corp., Nov. 1996.

\* cited by examiner

*Primary Examiner*—Joseph Thomas
*Assistant Examiner*—Natalie A. Pass
(74) *Attorney, Agent, or Firm*—Campbell Stephenson LLP

(57) ABSTRACT

A product rate calculation system utilizing a software component architecture advantageously provides a flexible insurance rating calculation system that can easily be scaled, modified, expanded, and implemented in various computer system operating environments, while still providing quick, and even real-time responsiveness to product rate requests. The product rate calculation system includes a product application or component object that requests a product rate from a product rate calculation software component, and can supply some or all of the rating information needed for the calculation. One or more support software components and one or more protocol stacks facilitate component communication.

19 Claims, 3 Drawing Sheets

INSURANCE RATING CALCULATION SOFTWARE COMPONENT ARCHITECTURE

BACKGROUND OF THE INVENTION

1. Field of the Invention

This invention relates to systems and methods for calculating product rates, and particularly to systems and methods for calculating insurance product rates using computer systems in a client/server environment.

2. Description of the Related Art

As more users begin to take advantage of businesses which use the Internet and the World Wide Web (the "web") to describe, market, sell, and deliver products and services, the performance of business web sites (e.g., web server applications running on server computer systems) becomes an issue of greater importance.

Depending on the type of product or service that is the subject of web-based electronic commerce, the challenges to providing rapid or even real-time responses to consumers can be great. For example, in providing insurance product information via the web, a website should efficiently gather consumer information and process that information to provide insurance product rate quotes. In general, an insurance product rate is the cost of a given unit of insurance. For example, in ordinary life insurance, the rate is the price of $1,000 of the face amount of the policy. The process of calculating an insurance rate (i.e., the rating process) can be very complicated and can require evaluating mathematical expressions that depend on consumer information, rating factors from look-up tables, and other relevant information. Compounding the difficulty inherent in this process is the desire to be able to calculate rates for a variety of different insurance products (e.g., automobile insurance, health insurance, life insurance, home insurance, renter's insurance) offered by a variety of different providers or insurance carriers. Thus, any one product from a particular carrier might require a rate calculation that is unique to that product/carrier combination.

In order to quickly calculate insurance product rates, the necessary mathematical expressions and data are typically encoded into the programming for the insurance product application (e.g., the web server application or application running in conjunction with a web server) that gathers information from a consumer and returns rate quote information (and perhaps other types of information) to the consumer. However, as product rate information changes, or as the need to add new products and/or carriers arises, the process of modifying the insurance product application can become cumbersome and inefficient. Additionally, as general use of the insurance product application increases, product rate calculations can effect overall system performance, either by simply consuming valuable system resources, or by posing a threat to system availability (e.g., product rate calculation process memory leaks). In other situations, the variety of product rate calculations can necessitate using legacy computer systems (e.g., a mainframe based product rate calculation system from an insurance product carrier), or executing product rate calculations in an operating system environment that is less advantageous to the execution of the product application generally.

Accordingly, it is desirable to have a flexible insurance rating calculation system that is scaleable; is modifiable to include new or updated product rate information; allows for the addition of multiple products and/or carriers; allows for quick calculation of product rates so that they can be returned to a consumer requesting such a rate in a short amount of time, or even in real-time; and can be implemented in a variety of different computer system operating environments.

SUMMARY OF THE INVENTION

It has been discovered that a product rate calculation system utilizing a software component architecture advantageously provides a flexible insurance rating calculation system that can easily be scaled, modified, expanded, and implemented in various computer system operating environments, while still providing quick, and even real-time responsiveness to product rate requests. The product rate calculation system includes a product application or component object that requests a product rate from a product rate calculation component object, and can supply some or all of the rating information needed for the calculation. One or more support software components and one or more protocol stacks facilitate component communication.

Accordingly, one aspect of the present invention provides a product rate calculation system including a product application, a first support software component, and a first protocol stack. The product application is operable to provide product information to, and receive consumer information from a user. Additionally, the product application is operable to send a call to a product rate calculation software component. The first support software component can receive the call from the product application, and the first protocol stack can process the call into a protocol for transmission over a communication link.

In another aspect of the invention, a method of calculating a product rate is disclosed. A request for a product rate is received from a user. The request for a product rate is converted into a call to a product rate calculation software component. The call to a product rate calculation software component is sent to a first support software component. The first support software component receives the call to a product rate calculation software component. The call to a product rate calculation software component is processed into a protocol for transmission over a communication link. The call to a product rate calculation software component is transmitted over the communication link.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1A:
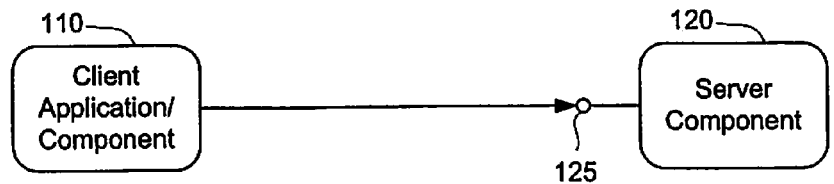
FIGS. 1A-1C illustrate examples of software component object communication.

A typical software component architecture allows applications and systems to be built from components supplied by different software vendors, created for a previous project, and/or written in different programming languages or for different system platforms. To accomplish this task, software component architectures should address several different issues: (1) Basic interoperability-How can developers create their own unique components, yet be assured that these components will interoperate with other components built by different developers? (2) Versioning—How can one system component be upgraded without requiring all the system components to be upgraded? (3) Language independence-How can components written in different languages communicate? and (4) Transparent cross-process interoperability-How can we give developers the flexibility to write components to run in-process, cross-process, and cross-network, using one simple programming model?

In general, a software component object, or component, provides services to various other components or applications through an interface that the component implements. A component that provides an interface is typically referred to as server component (server), and a component that uses the services of the interface is typically a client component (client). A client component is passed a pointer to the interface and requests services by invoking the methods of the interface. In certain cases, the client component may want to be notified directly by the server component of some event, or the server component may want to retrieve information from its client component. To that end, the client component can provide its own interface to the server component. The server component is passed a pointer to this "reverse" interface and requests services by invoking methods of the reverse interface. Typically, a server component provides a specific interface and request services of the client component through a specific reverse interface.

The communication between client and server components can be either unidirectional or bi-directional. Unidirectional communication occurs when the client component does not provide a reverse interface. Thus, services are only provided by the server component. Bi-directional communication occurs when both the client and server components provide interfaces. Thus, services are provided by both the server and client components (in this example, the distinction between server component and client component can become meaningless). A connection is established between a server component and a client component by passing a pointer to the interface from the server to the client and if the protocol is bi-directional, passing a pointer to the reverse interface from the client to the server. Furthermore components can have more than one interface, and can be part of larger application programs.

A number of different software component architectures exist in an effort to address some or all of the above mentioned issues and to implement the aforementioned generic architecture. Examples of software component architectures include the Object Management Group's Common Object Request Broker Architecture (CORBA) and the Internet Inter-Object Request Broker (ORB) Protocol (IIOP), Java's Remote Method Invocation (RMI), and Microsoft Corporation's Component Object Model (COM) and Distributed COM (DCOM) architectures.

The COM/DCOM software component architectures are among the most successful examples of software component architectures, and examples drawn from COM/DCOM implementations will be used throughout the remainder of this description. Nevertheless, one having ordinary skill in the art will readily recognize that a variety of different software component architecture schemes can be used to implement the inventions described.

COM defines several fundamental concepts that provide the model's structural underpinnings. These include: (1) a binary standard for function calling between components; (2) a provision for strongly-typed groupings of functions into interfaces; (3) a base interface providing a way for components to dynamically discover the interfaces implemented by other components and reference counting to allow components to track their own lifetime and delete themselves when appropriate; (4) a mechanism to uniquely identify components and their interfaces; and (5) a "component loader" to set up component interactions and additionally in the cross-process and cross-network cases to help manage component interactions.

Additionally, DCOM extends COM to support communication among component objects on different computers through, for example a local area network (LAN), a wide area network (WAN), or through the Internet.

When a client has access to a component object, it has nothing more than a pointer through which it can access the functions in the interface, called simply an interface pointer. The pointer interface hides all aspects of internal component implementation so that, for example, none of the component object's data is directly accessible, as opposed to C++ object pointers through which a client may directly access the object's data. In COM, the client can call only methods of the interface to which it has a pointer. This encapsulation allows COM to provide an efficient binary standard that enables local/remote transparency. Additionally, the interface scheme also allows for transparent remoting (cross-process or cross-network calling) since data access is through methods that can exist in a proxy object that forwards the request and vectors back the response.

The most common type of interface implemented in the COM/DCOM software component architectures is the virtual function table (vtable) interface. COM defines a standard way to lay out vtables in memory, and a standard way to call functions through the vtables. Thus, any language that can call functions via pointers (C, C++, Small Talk®, Ada, and even Basic) can be used to write components that can interoperate with other components written to the same binary standard. The double indirection (the client holds a pointer to a pointer to a vtable) allows for vtable sharing among multiple instances of the same object class.

COM/DCOM is designed to allow clients to transparently communicate with components regardless of where those components are running. Accordingly, there is a single programming model for all types of component objects for not only clients of those component objects, but also for the servers of those component objects. Thus, software component architectures generally, and the COM/DCOM architectures specifically, allow a client component or application to communicate with a server component when the two are in the same process (in-process), in different processes on the same machine (cross-process), or in different processes on different machines (remote). Each of these component communication schemes are illustrated in FIGS. 1A-1C, respectively.

From a client's point of view, all component objects are accessed through interface pointers. A pointer must be in-process, and in fact, any call to an interface function always reaches some piece of in-process code first. Referring to FIG. 1A, if server component object 120 is in-process, then a call from client application/component 110 reaches server component object 120 directly through interface 125. A client that needs to communicate with a component in another process cannot call the component directly, but has to use some form of interprocess communication provided in conjunction with the operating system. COM provides this communication in a completely transparent fashion: it intercepts calls from the client and forwards them to the component in another process.

Figure 1B:
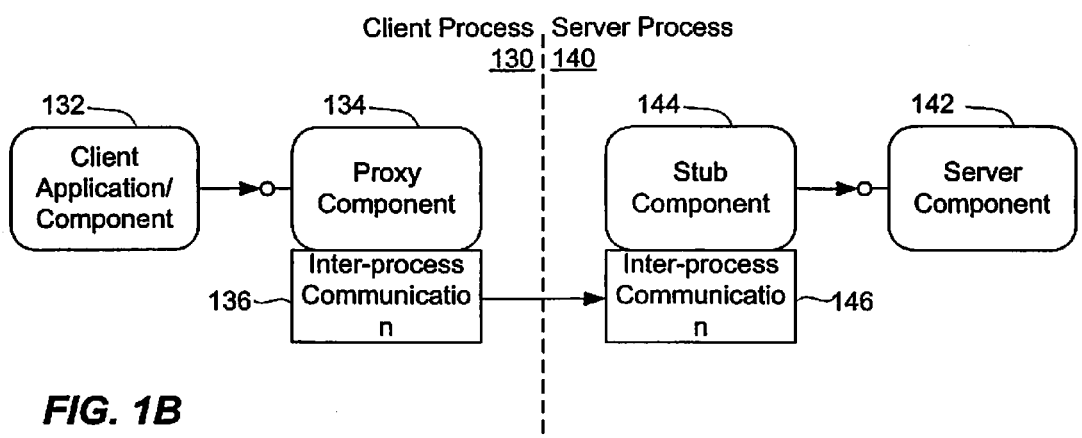

FIG. 1B includes two different processes, client process 130, and server process 140, both of which are executing on the same computer system. Since server component object 142 is out-of-process with respect to client application/component 132, then a call from client application/component 132 first reaches proxy component object 134 provided by COM itself (e.g., as part of runtime libraries available through the operating system) which, in turn, generates the appropriate remote procedure call to the other process, passing the call through inter-process communication blocks 136 and 146. A typical implementation of inter-process communication blocks 136 and 146 utilizes local procedure calls. From the point of view of server component object 142, calls to a component object's interface functions are made through a pointer to that interface. Again, a pointer only has context in a single process, and so the caller must be some piece of in-process code. If the component object is in-process, the caller is the client itself. Otherwise (as is the case in FIG. 1B), the caller is a stub component object 144 provided by COM. Stub component object 144 picks up the remote procedure call from proxy component object 134 in client process 130, and turns it into an interface call to server component object 142.

Figure 1C:
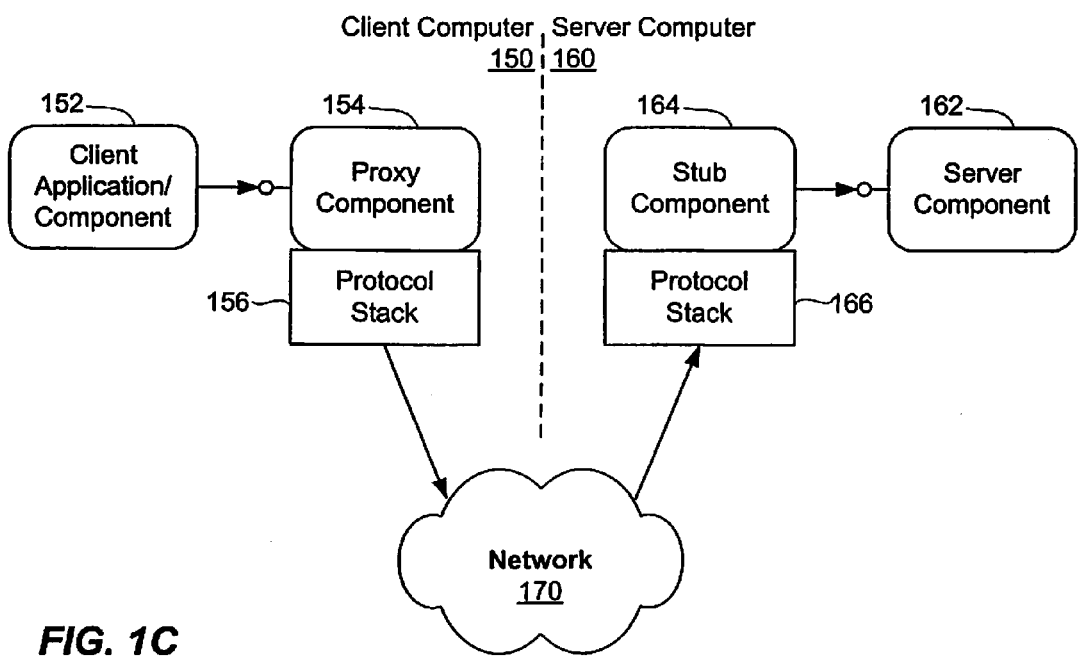

FIG. 1C illustrates the situation where the client component (152) object and the server component object (162) reside on different computer systems, namely client computer 150 and server computer 160. In this example, local inter-process communication blocks 136 and 146 are replaced with network protocol stacks 156 and 166, respectively. Consequently, component object communication can be through network 170. The term "network" is used in the broadest sense, and can include, for example simple point-to-point connections, LANs, WANs, and the Internet. Note also that proxy component objects 134 and 154, and stub component objects 144 and 164, can include, or be associated with, a variety of additional services (not shown) such as security provision. Proxy component objects 134 and 154, and stub component objects 144 and 164, are examples of software components that provide COM/DCOM support.

A more thorough description of the COM and DCOM architectures is provided in "The Component Object Model: A Technical Overview," Sara Wiliams and Charlie Kindel, Developer Relations Group, Microsoft Corp., October, 1994, (http://msdn.microsoft.com/isapi/msdnlib.idc?theURL=/library/techart/msdn_comppr. htm); and "DCOM Technical Overview," Microsoft Corp., November 1996, (http://msdn.microsoft.com/isapi/msdnlib.idc?theURL=/library/backgrnd/html/msdn_dcomtec.htm); respectively, which are incorporated herein, in there entirety, by reference.

Client/server computer systems operating in a distributed computing environment (e.g., web client/server computer systems) are routinely used to generate business or business leads for a variety of enterprises. One specific example of this type of business activity is providing insurance information to, and generating leads from users of a web based insurance site. (The focus throughout this application will be on insurance business applications, but those having ordinary skill in the art will readily recognize the applicability of many of the described techniques to a variety of different fields of business and both web-based and non-web-based client/server activities in general.) The information that is provided by the user (typically a consumer) varies depending on both the subject of the insurance policy to be underwritten and the type of coverage desired. For instance, in the case of automobile insurance, the information provided by the user includes information about the vehicle or vehicles to be covered under the policy, information about the driver or drivers to be covered under the policy, and information about the type of coverage requested by the user.

Figure 2:
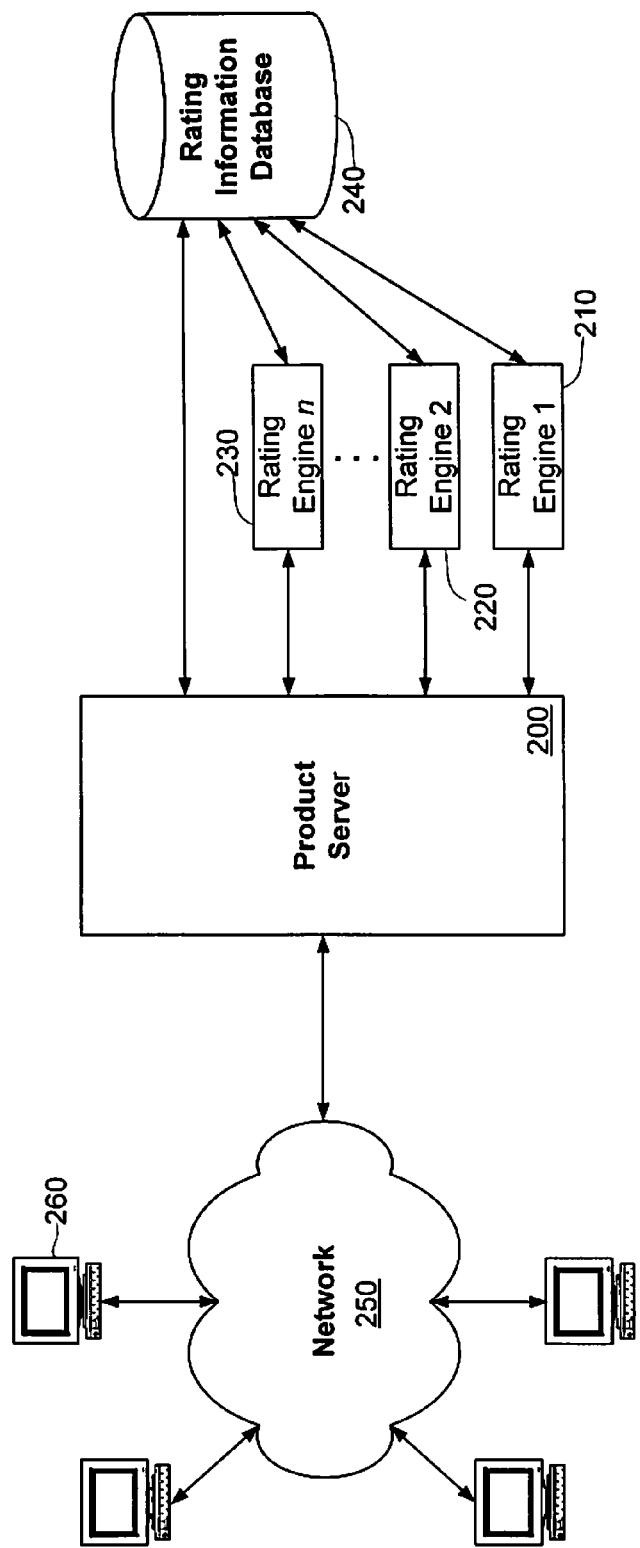
FIG. 2 illustrates a client/server computing environment utilizing a product rate calculation system.

FIG. 2 illustrates a client/server computing environment for providing insurance product information to users via, for example, an interactive web site, and utilizing a product rate calculation system. Product server 200 is typically a web server including the necessary hardware and software to serve hypertext markup language (HTML) documents, associated files, and scripts to one or more user client (typically web client) computer systems 260 when requested by a user of, or an autonomous program executing on a user client computer system. User client computer systems 260 typically utilize HTML browsers to display the HTML documents, and to generally interact with server 200. As illustrated, server 200 and clients 260 are coupled to each other through a communications network 250, such as the Internet. Server 200 and clients 260 can alternately be coupled to each other through point-to-point connections, or dedicated connections, or some other communications link. Server 200 is typically an Intel Pentium-based or RISC based computer system equipped with one or more processors, memory, input/output interfaces, a network interface, secondary storage devices, and a user interface.

Server 200 is a product server in that it typically includes one or more insurance product applications executing on the server hardware, for example automobile, life, home, health, and/or renter's insurance product applications. Product applications provide users, through common web serving software, with functionality and content for different insurance products. As illustrated, product server 200 can serve both web and product server applications. For example, one server computer system can execute one or more separate processes for insurance product applications while also executing one or more processes specifically for serving web content to client computer systems 260. Alternately, the insurance product server applications and any web server applications can each execute on a separate computer system. Or, there can be some combination of the two previous approaches. Thus, product server 200 is merely illustrative of web/product server schemes.

Each insurance product application typically utilizes a respective application database, such as rating information database 240, to store data associated with that particular insurance product, although one or more insurance product applications can share a database. Rating information can include both consumer information (e.g., information obtained from users of client computer systems 260) and product information. Additionally, the one or more databases used by insurance product applications can be separated from one or more dedicated rating information databases. The databases used, and the database management systems (DBMSs) used to allow access to and control of the databases can be based on a variety of database schemes, but are typically relational in nature, for example structured query language (SQL) databases and DBMSs.

In the example illustrated in FIG. 2, rating engines 210, 220, and 230 are used by product server 200 to determine insurance product rates. Rating engines 210, 220, and 230 are typically implemented (in whole or in part) as software component objects (e.g., server component objects) and perform the necessary insurance product rate calculations using rating information. Since the rating engines are implemented as software component objects, the various communication links between rating engines 210, 220, and 230 and product server 200 can be implemented as illustrated in FIGS. 1A-1C, that is, using in-process, cross-process, or remote communication. Accordingly, a variety of different rating engines can be implemented, yet all can operate in conjunction with product server 200. For example, rating engine 210, can be an in-process or cross-process component object executing on the same computer system as product server 200, while rating engine 220 is a component object executing on a computer system separate from product server 200 but located in the same facility, and rating engine 230 is a component object executing at a physically separate facility in conjunction with a legacy rating calculation application. Various other rating engine examples are possible.

When presented with the need to calculate a product rate, for example a user of computer system 260 has requested a health insurance product rate, product server 200 provides some information needed by rating engines 210, 220, and 230. This information could simply be a rating identification number, unique to the particular product rate being requested, that is then used by one or more of the rating engines to access rating information from database 240. Alternately, product server 200 can provide all of the information needed to perform the rate calculation to any of the invoked rating engines, thereby obviating the need for the rating engines to have a communication link with database 240. Similarly, once a product rate is calculated by a particular rating engine, it can be returned to product server 200, or written to database 240, for later retrieval by product server 200. Rating information database 240 can itself implement one or more software component objects, and thus one or more of the rating engines can communicate with database 240 using the previously described software component object communication schemes.

Rating information database 240 contains much (if not all) of the information necessary to perform a rate calculation. This information is stored as database records, and can include: stored procedures for calculating rates, insurance rate formulae stored as logical and algebraic expressions, n-dimensional (i.e., one or more) tables of rating factors, miscellaneous numeric values; and any other information used to calculate insurance rates. Additionally, some rating engines may use little or no information provided by rating information database 240. For example, if the rating engine used is associated with a legacy rating calculation application, all of the information needed to perform the calculation could be supplied to the rating engine from product server 200.

Figure 3:
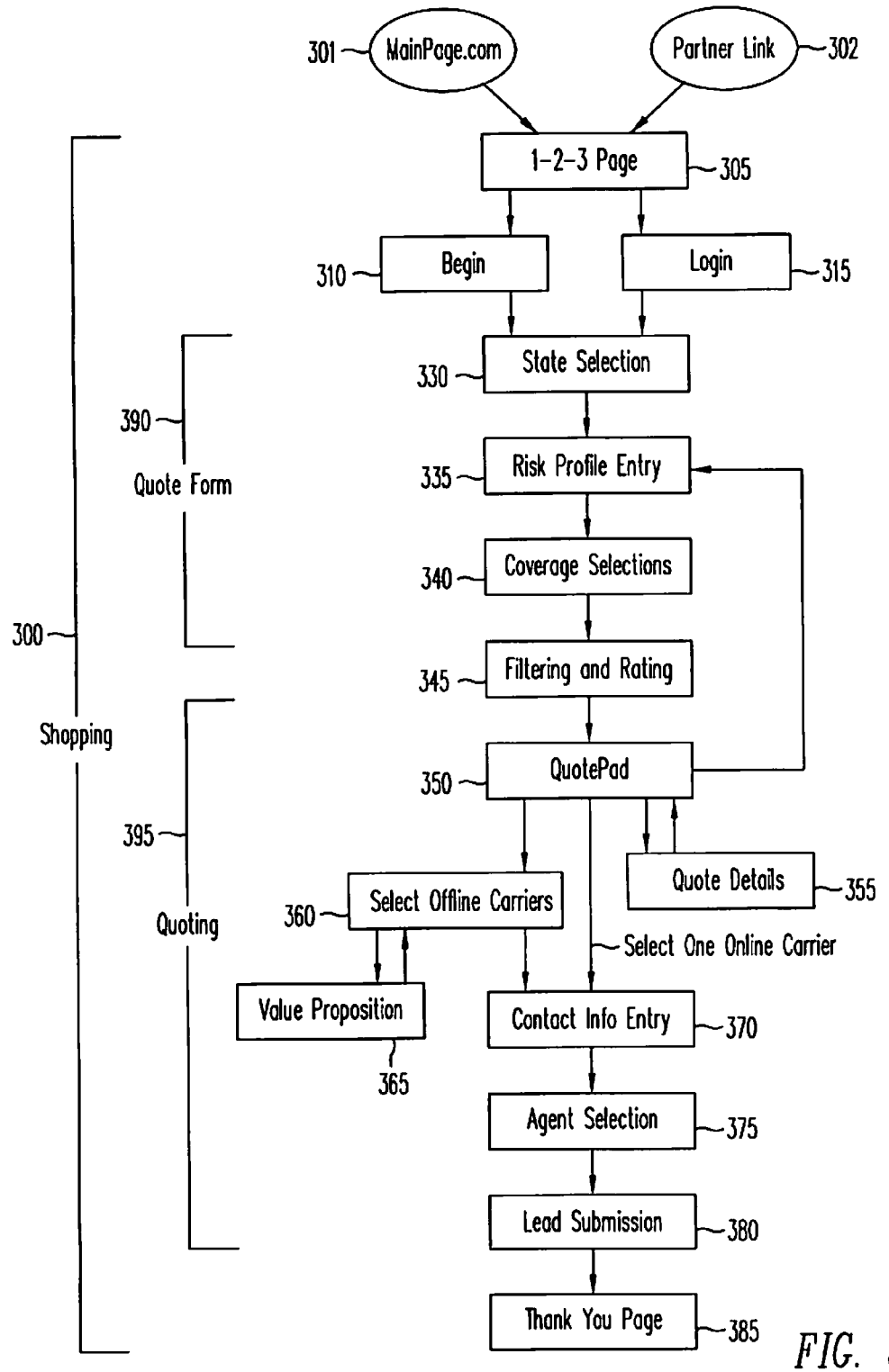
FIG. 3 is a functional diagram of the program flow for a typical insurance product application executing on, for example, a product server, such as that illustrated in FIG. 2.

FIG. 3 is an example of the program flow for a typical insurance product application executing on, for example, product server 200. The program flow illustrated in FIG. 3 is common to most insurance products, and includes a sequence of steps or phases in which a user interacts with the product application. Since insurance quotes are typically based on statistical data which is correlated to the information provided by a potential insured, computers can greatly reduce the time and expense associated with generating insurance quotes. In particular, computer quoting systems allow insurance agents to provide accurate quotes to potential clients in a matter of minutes by inputting the client's information into the system and automatically generating quotes based on the information provided by the client.

A user begins the process by entering the product application through the first page of the product, 1-2-3 page 305 via a hyperlink 301 located on the home page of a web server operating on product server 200 of FIG. 2, or via a hyperlink 302 from another web site, such as a web site belonging to a business partner, portal, or search engine. The first page of the product 305 typically explains the process to follow. The user begins the data entry process either by accessing an existing account on the system (315) or by creating a new account (310) and entering appropriate information about the user.

Because insurance requirements, laws, coverage, and costs vary significantly from state to state, the first step in obtaining quote information is to select a state of residence 330. Next, the user provides information about their risk profile 335. For example, if the user has entered the automobile insurance product application, 335 might require automobile information, driving record information, and other personal information. In 340, the user provides information about the type and amount of coverage desired, e.g., deductible amount, maximum liability, etc. Activities in 330, 335, and 340 are generally referred to as quote form activities 390 because they are analogous to traditional paper forms used to gather information needed to process an insurance quote request.

Once the quote form activities 390 are complete, a quoting session 395 is initiated. The process starts with filtering 345, in which the system evaluates a set of rules against the risk profile for each available product offered by an insurance carrier available in the program. Products that pass the filtering process are sent through a rating process to determine the appropriate quote for the user, and such a rating process is typically implemented as system such as the system illustrated in FIG. 2. Quotes are presented to the user via QuotePad 350. QuotePad 350 contains information about both on-line and off-line quotes available to the user. On-line quotes can be presented directly to the user by the insurance product application, and the QuotePad can include links to the providers associated with the on-line quotes. In some instances, a user can request detailed information about the quotes in 355. Still other information might include how to contact an agent or the provider via e-mail, telephone, or traditional mail. Off-line quotes are sent to the user by alternate means such as e-mail or regular mail at a later time, and are selected at 360. When the user selects one or more products for carrier submission, the product selection generates either a request for coverage (RFC or instant lead) or a request for quote (RFQ or delayed lead). With an RFC, the user has been presented with an instant quote for a product. For an RFQ, a carrier is responsible for generating a quote and returning it to the user. Once a user has selected a product for lead submission, information must be collected such as contact information 370 that enables a carrier to respond to the user, or agent selection 375. In 380 the lead is submitted to the carrier, and in 385 an appropriate message is displayed, thanking the user. The process also allows for specialized marketing such as value proposition 365. A value proposition page can include the presentation made by a carrier to users regarding products offered by the carrier. The activities described in FIG. 3 can collectively be described as a shopping session 300.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A computer readable storage medium storing program instructions, wherein the program instructions are executable to implement:

a product application operable to provide product information to and receive consumer information from a user, and further operable to convert a request received from the user into a call to a product rate calculation software component and to send the call to the product rate calculation software component, wherein being operable to send the call comprises being operable to send at least one pointer to a product rate calculation software component interface;

a first support software component operable to receive the call from the product application; and a first protocol stack operable to process the call into a protocol for transmission over a communication link.

2. The computer readable storage medium of claim 1 wherein the at least one pointer indicates rating information stored in a database.

3. The computer readable storage medium of claim 1 wherein the product application and the first support software component execute in a single process.

4. The computer readable storage medium of claim 1 wherein the product application further comprises at least one product application software component.

5. The computer readable storage medium of claim 1 wherein the protocol stack is a network protocol stack.

6. The computer readable storage medium of claim 1 further storing program instructions executable to implement:

the product rate calculation software component having the product rate calculation software component interface, the product rate calculation software component for calculating a product rate depending upon rating information;

a second support software component; and a second protocol stack; wherein a communication link is coupled between the first protocol stack and the second protocol stack, the second protocol stack operable to receive and process a transmission from the first protocol stack into the call to the product rate calculation software component, the second support software component for sending the call to the product rate calculation software component to the product rate calculation software component interface.

7. The computer readable storage medium of claim 6 wherein the first support software component is a proxy component and the second support software component is a stub component.

8. The computer readable storage medium of claim 6 wherein the communication link is a network.

9. The computer readable storage medium of claim 6 wherein the product rate calculation software component and the second support software component execute in a single process.

10. The computer readable storage medium of claim 6 wherein the rating information includes at least one of the consumer information and product information.

11. The computer readable storage medium of claim 1 wherein the product application is an insurance product application and the product information includes an insurance product rate.

12. The computer readable storage medium of claim 11 wherein the insurance product rate is for one of home insurance, life insurance, health insurance, automobile insurance, and renter's insurance.

13. A product rate calculation system comprising: a processor, a memory coupled to the processor, and a network interface, and wherein the memory stores program instructions executable by the processor to implement:

a product application operable to provide product information to and receive consumer information from a user, and further operable to convert a request received from the user into a call to a product rate calculation software component and to send the call to the product rate calculation software component, wherein being operable to send the call comprises being operable to send a pointer to a product rate calculation software component interface;

a first support software component operable to receive the call from the product application; and a first protocol stack operable to process the call into a protocol for transmission over a communication link.

14. A method comprising:

receiving a request for a product rate from a user;

converting the request for a product rate into a call to a product rate calculation software component;

sending the call to a product rate calculation software component to a first support software component, wherein the sending the call comprises sending at least one pointer to a product rate calculation software component interface;

receiving, at the first support software component, the call to a product rate calculation software component;

processing the call to a product rate calculation software component into a protocol for transmission over a communication link; and transmitting the call to a product rate calculation software component over the communication link.

15. The method of claim 14 further comprising:

receiving the transmitted call to the product rate calculation software component;

processing the transmitted call to the product rate calculation software component;

sending the processed call to a second support software component;

receiving, at a second support software component, the call to the product rate calculation software component;

sending the call to the product rate calculation software component to the product rate calculation software component interface; and performing a product rate calculation depending upon rating information.

16. The method of claim 15 further comprising retrieving rating information from a database.

17. The method of claim 15 further comprising storing a calculated product rate in a database.

18. The method of claim 14 wherein the receiving a request further comprises receiving consumer information from a computer system.

19. The method of claim 14 wherein the product rate is an insurance product rate.

* * * * *